(12) United States Patent
Tadeparthy et al.

(10) Patent No.: US 8,248,150 B2
(45) Date of Patent: Aug. 21, 2012

(54) PASSIVE BOOTSTRAPPED CHARGE PUMP FOR NMOS POWER DEVICE BASED REGULATORS

(75) Inventors: Preetam Charan Anand Tadeparthy, Bangalore (IN); Vikram Gakhar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 417 days.

(21) Appl. No.: 12/649,067

(22) Filed: Dec. 29, 2009

(65) Prior Publication Data

US 2011/0156670 A1 Jun. 30, 2011

(51) Int. Cl.
*H03K 3/01* (2006.01)
(52) U.S. Cl. .......................................... 327/534; 363/60
(58) Field of Classification Search .......... 323/282–299, 323/303; 327/530–540; 363/41, 43, 70, 363/71, 72, 75
See application file for complete search history.

(56) References Cited

U.S. PATENT DOCUMENTS

| | | | | |
|---|---|---|---|---|
| 5,563,501 A | * | 10/1996 | Chan | 323/282 |
| 6,411,531 B1 | * | 6/2002 | Nork et al. | 363/60 |
| 6,445,623 B1 | * | 9/2002 | Zhang et al. | 365/189.11 |
| 6,661,683 B2 | * | 12/2003 | Botker et al. | 363/60 |
| 7,015,841 B2 | * | 3/2006 | Yoshida et al. | 341/120 |
| 7,561,404 B2 | * | 7/2009 | Sells | 361/246 |

* cited by examiner

*Primary Examiner* — Rajnikant Patel
(74) *Attorney, Agent, or Firm* — William B. Kempler; Wade J. Brady, III; Frederick J. Telecky, Jr.

(57) ABSTRACT

A charge pump in a low dropout (LDO) regulator includes a first capacitor coupled to an output of an amplifier and to a gate of a pass transistor. A first plurality of switches is operable to couple a second capacitor between an output of the LDO regulator and to a ground in a first clock phase, such that the second capacitor charges to an output voltage. A second plurality of switches is operable to couple the second capacitor in parallel to the first capacitor in a second clock phase such that the second capacitor charges the first capacitor.

14 Claims, 4 Drawing Sheets

US 8,248,150 B2

PASSIVE BOOTSTRAPPED CHARGE PUMP FOR NMOS POWER DEVICE BASED REGULATORS

TECHNICAL FIELD

Embodiments of the disclosure relate to a charge pump in a low dropout (LDO) regulator.

BACKGROUND

Mobile handset applications demand an LDO architecture that works down to very low input voltage (for example, 1.4V) still providing good power supply rejection ratio (PSSR) and transient response. One conventional technique to achieve this is to use a charge pump 110 to boost a gate of a pass transistor 115 as illustrated in FIG. 1. The constraint on an NMOS based power device (pass transistor) design is that the gate of the power device needs to be enhanced higher than the output voltage. Under very high output voltage ($V_{OUT}$) applications, it would demand that the power supply to be higher than $V_{OUT}$. To solve this problem, the conventional approaches charge the gate of the pass transistor 115 to a higher voltage by pumping extra charge to the gate. One conventional charge pumping technique is to have a series coupling capacitor 135 isolating the gate of the pass transistor 115 from the amplifier 105 and to use this capacitance as a level shifter. This capacitor 135 is charged to a predetermined voltage which is controlled by a servo amplifier 140 whose supply alone is boosted.

However, the conventional charge pump technique results in higher output noise due to ripple leak from the switching circuit. Few additional problems with the conventional charge pump technique are explained below. The servo amplifier 140 needs additional charge pump on the supply which is constantly drained by the servo amplifier's 140 quiescent current. This not only requires additional higher value capacitor but also needs to be switched at high enough frequency that the voltage change at the input of the servo amplifier 140 is not so high that it results in additional problems. The servo amplifier 140 also needs to have very high PSRR at the frequency of switching so that that input ripple does not appear as a ripple at the gate, which cannot be filtered, especially at higher load current where the NMOS pass transistor 115 has very high bandwidth. The sudden changes in the line and load of the servo amplifier 140 will result in either over charging the output capacitance in line or losing charge on the capacitor 135 as the load change has coupled through the $C_{GS}$ and discharged the output capacitor 125 which could not be replenished quickly enough by the servo amplifier 140. Additionally, the servo amplifier 140 has to be a wideband amplifier which requires additional power. The internal switches of the charge pump 110 have to be carefully implemented to avoid dumping charge on $V_{IN}$, which in some cases is not ideal.

SUMMARY

An example embodiment provides a charge pump in a low dropout (LDO) regulator. The LDO regulator includes an amplifier having an output; a first capacitor coupled to the output and to a gate of a pass transistor; a first plurality of switches operable to couple a second capacitor between an output of the LDO and to a ground in a first clock phase such that the second capacitor charges to an output voltage; and a second plurality of switches operable to couple the second capacitor in parallel to the first capacitor in a second clock phase such that the second capacitor charges the first capacitor.

An example embodiment provides a charge pump in an LDO regulator. The LDO regulator includes an amplifier having an output; a first capacitor coupled to the output and to a gate of a pass transistor; a first plurality of switches operable to couple a second capacitor between an output of the LDO and to a ground in a first clock phase such that the second capacitor charges to an output voltage, and that is operable to couple a third capacitor in parallel to the first capacitor the second capacitor charges the first capacitor; and a second plurality of switches operable to couple the third capacitor between an output of the LDO and to a ground in a first clock phase such that the second capacitor charges to an output voltage, and that is operable to couple the second capacitor in parallel to the first capacitor the second capacitor charges the first capacitor.

An example embodiment provides a method for operating a charge pump in an LDO regulator. A second capacitor is charged to an output voltage of the LDO in a first clock phase. The second capacitor is coupled between an output of the LDO and to a ground. Further, a first capacitor is charged using the second capacitor in a second clock phase. The first capacitor is coupled between an output of an amplifier of the LDO and a gate of a pass transistor.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Embodiments of the disclosure provide a passive bootstrapped charge pump in a low dropout (LDO) regulator. For an amplifier with an NMOS source follower output stage, Kirchhoff's voltage law (KVL) equation is given as $V_{GATE}=V_{GS}+V_{OUT}$ where $V_{GATE}$ is the gate voltage of the NMOS transistor, $V_{GS}$ is the gate source voltage of the NMOS transistor and $V_{OUT}$ is the output voltage. Any amplifier driving an NMOS source follower output stage is required to generate this voltage. In general, various embodiments generates this voltage by sampling an output of the LDO to charge a series capacitance in one clock phase and transfers this charge to a capacitor coupled between an amplifier and a pass transistor of the LDO, such that the capacitor provides necessary DC shift at a gate of the pass transistor. Various embodiments are explained using an LDO regulator as an example. However, it will be appreciated that various embodiments can be used in other voltage regulators.

Figure 2:
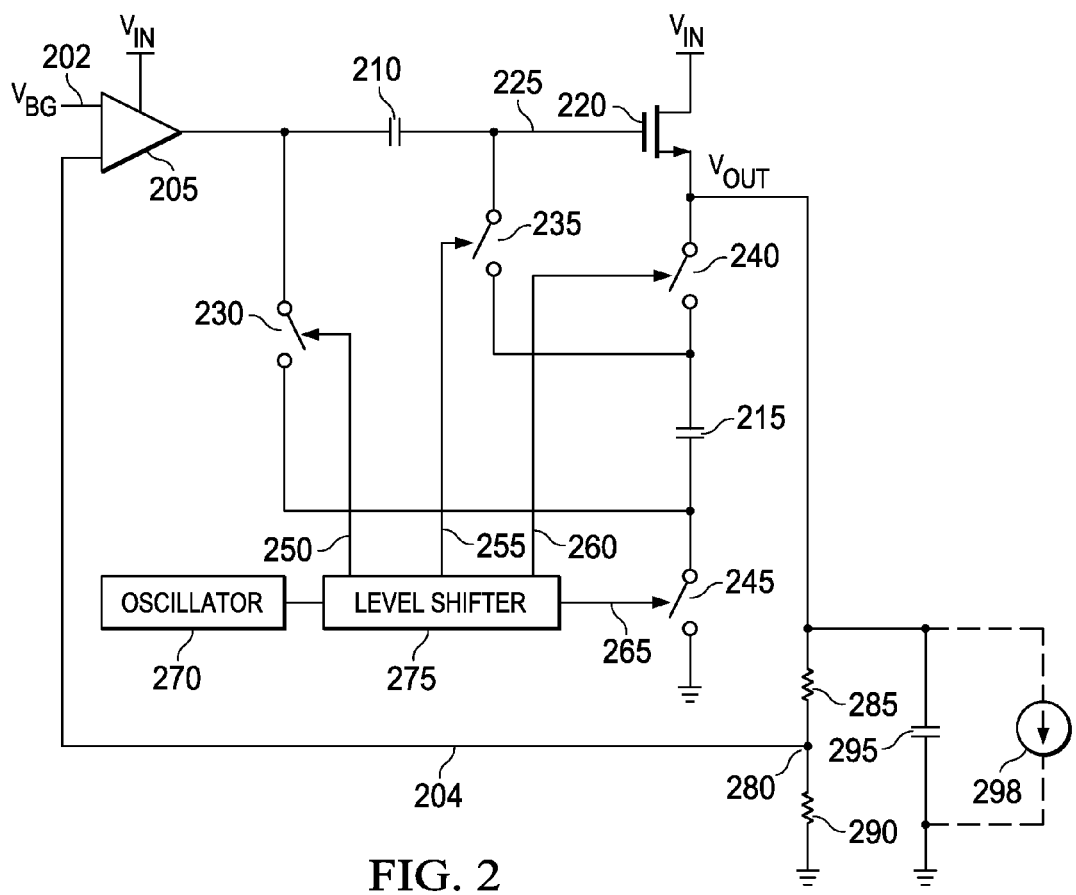
FIG. 2 illustrates an LDO regulator with a passive bootstrapped charge pump according to an embodiment.
Figure 3:
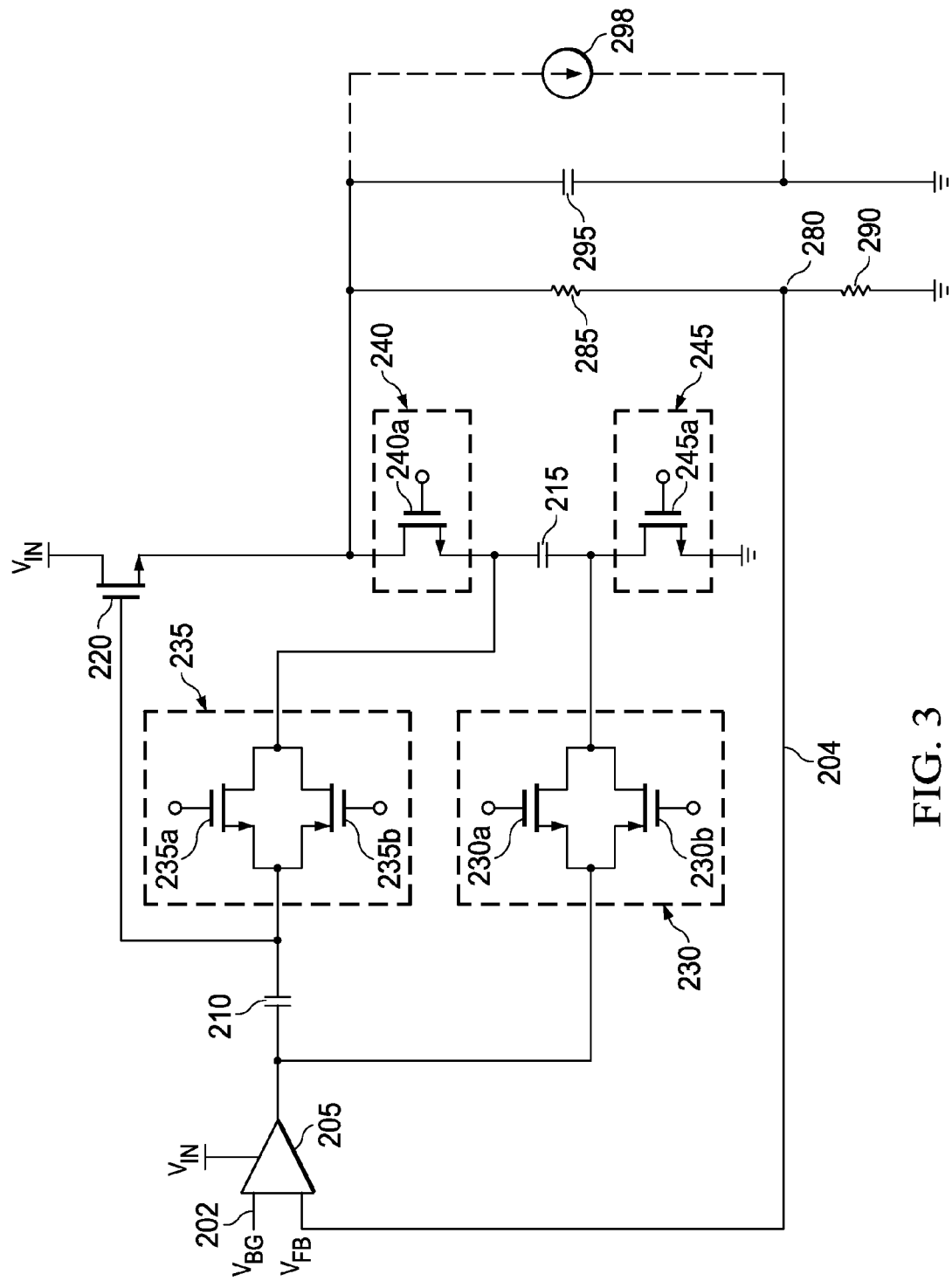
FIG. 3 illustrates an example implementation of the LDO of FIG. 2.

FIGS. 2 and 3 illustrate a passive bootstrapped charge pump and an example implementation of the same. Referring to FIG. 2, the LDO includes an amplifier 205 receiving a supply voltage $V_{IN}$, a reference voltage $V_{BG}$ (from a bandgap reference circuit, not shown in FIG. 2) and a feedback voltage $V_{FB}$ from a node 280. Node 280 is defined on a resistor divider at an output of the LDO ($V_{OUT}$) having resistors 285 and 290. An output of the amplifier 205 is connected to a first capacitor 210, hereinafter referred to as capacitor 210. The capacitor 210 is connected to a gate of a pass transistor 220. A drain of the pass transistor 220 receives supply voltage $V_{IN}$. A source of the pass transistor 220 is connected to a second capacitor 215, hereinafter referred to as capacitor 215 through a switch 240. An output of the LDO ($V_{OUT}$) is defined on the source of the pass transistor 220. In this embodiment, the pass transistor 220 is an NMOS transistor. The capacitor 215 is connected to the ground through a switch 245. A switch 230 is connected between top plates of the capacitor 210 and the capacitor 215. Another switch 235 is connected between bottom plates of the capacitor 210 and the capacitor 215. The LDO further includes an external capacitor 295 connected between the output of the LDO and the ground. A load 298 is connected at the output of the LDO. An output of an oscillator 270 is connected to a level shifter 275. Various outputs of the level shifter 275 is connected to the switches 230, 235, 240 and 245 on lines 250, 255, 260 and 265 respectively.

In operation, the oscillator 270 generates a clock signal that is provided to the level shifter 275. The level shifter 275 translates the clock signal level to an appropriate voltage and polarity to control each switch. In a first clock phase switches 240 and 245 are closed. Switches 230 and 235 are opened in the first clock phase. This connects the capacitor 215 to the $V_{OUT}$ such that the capacitor 215 charges to $V_{OUT}$. In the second clock phase switches 240 and 245 are opened. Switches 230 and 235 are closed in second clock phase. So, the capacitor 215 is connected in parallel to capacitor 210 and charge is transferred from capacitor 215 to capacitor 210. In steady state the clock phases continue such that the capacitor 215 is charged to $V_{OUT}$ in one clock phase and the capacitor 215 charges capacitor 210 in another clock phase.

It is noted that under steady state, capacitor 215 looses some amount of charge due to parasitic capacitance. In the second clock phase, when the capacitor 215 is connected in parallel to the capacitor 210, the top plate of the capacitor 215 is charged by the amplifier 205. However, a bottom plate of the capacitor 215 is at $V_{OUT}$ and it needs to charge to $V_{OUT}$+ $V_{GS}$, wherein $V_{GS}$ is the gate source voltage of the pass transistor 220. Capacitor 210 provides this additional charge. This is the only charge that needs to be transferred in steady state due to parasitic capacitance. All the other parasitic capacitances are already charged. With non-ideal switches, the channel charge causes disturbance on capacitance of the capacitor 210. This difference gets replenished in the second clock phase when the capacitor 215 is connected in parallel to capacitor 210.

Example implementation of switches 230, 235, 240 and 245 are illustrated in FIG. 3. Switch 230 is implemented as a complementary switch with the sources and drains of the NMOS transistor 230a and PMOS transistor 230b. Gates of the transistors 230a and 230b are controlled from the output of the level shifter 275. Similarly switch 235 is also implemented as a complementary switch with NMOS transistor 235a and PMOS transistor 235b. Switch 240 is implemented using an NMOS transistor 240a with a gate controlled from an output of the level shifter 275. Similarly switch 245 is implemented using an NMOS transistor 245a with a gate controlled from an output of the level shifter 275. The output of the level shifter functions as a self bootstrapped that controls the switches 230, 235 and 240. It is noted that switches 230, 235, 240 and 245 are implemented as explained above in this embodiment. However, various embodiments can use various combinations of switches can be implemented to replace the switches 230, 235, 240 and 245, for example, a PMOS switch, an NMOS switch or a complementary switch.

Figure 4:
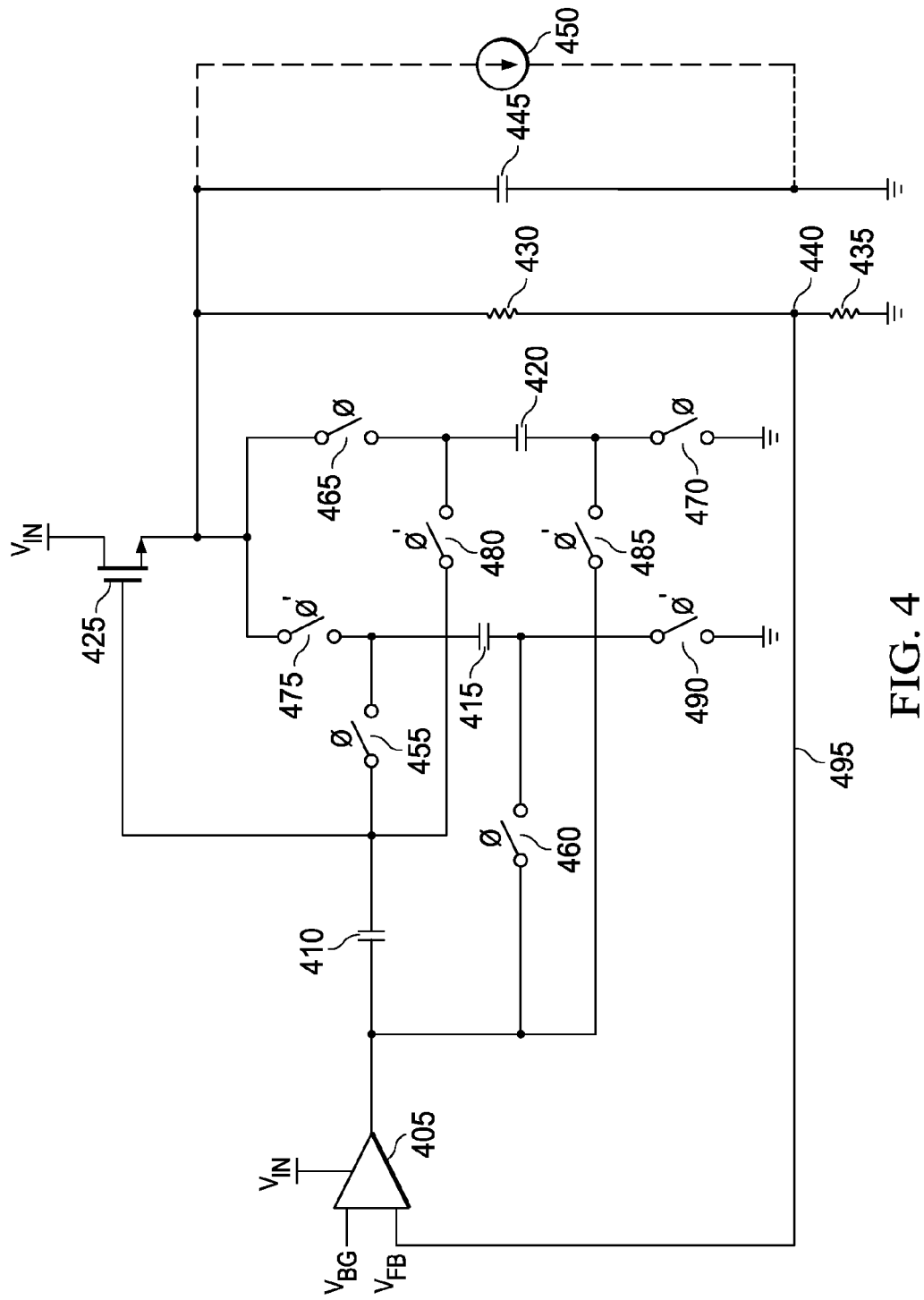
FIG. 4 illustrates an LDO regulator with a dual bootstrapped charge pump according to an embodiment.

A dual bootstrapped charge pump as illustrated in FIG. 4 can be used to reduce peak to peak ripple value and increase speed of functionality, which is an extension of the embodiment as illustrated in FIGS. 2 and 3. The LDO in FIG. 4 includes an amplifier 405 receiving a supply voltage $V_{IN}$, a reference voltage $V_{BG}$ (from a bandgap reference circuit, not shown in figures) and a feedback voltage $V_{FB}$ from a node 440. Node 440 is defined on a resistor divider at an output of the LDO having resistors 430 and 435. An output of the amplifier 405 is connected to a capacitor 410 (first capacitor). The capacitor 410 is connected to a gate of a pass transistor 425. A drain of the pass transistor 425 receives supply voltage $V_{IN}$. A source of the pass transistor 425 is connected to a capacitor 415 (second capacitor) through a switch 475. An output of the LDO ($V_{OUT}$) is defined on the source of the pass transistor 425. The pass transistor 425 is an NMOS transistor. The capacitor 415 is connected to the ground through a switch 490. The source of the pass transistor 425 is also connected to a capacitor 420 (second capacitor) through a switch 465. The capacitor 415 is connected to the ground through a switch 470.

A switch 460 is connected between the top plates of the capacitor 410 and the capacitor 415. Similarly a switch 485 is connected between the top plates of the capacitor 410 and the capacitor 420. A switch 455 is connected between the bottom plates of the capacitor 410 and the capacitor 415. Similarly another switch 480 is connected the bottom plates of the capacitor 410 and the capacitor 420. However, in an embodiment a top plate of a capacitor can be connected to a bottom plate of another capacitor through switches.

The LDO further includes an external capacitor 445 connected between the output of the LDO and the ground. A load 450 is connected at the output of the LDO. The switches 455, 460, 465, 470, 475, 480, 485 and 490 are controlled using control signals that are generated from an oscillator and a level shifter as explained earlier.

In operation, in a first clock phase switches 455, 460, 465 and 470 are closed (Φ denotes the first clock phase in FIG. 4) and switches 475, 480, 485 and 490 are opened. This connects the capacitor 420 to the $V_{OUT}$ such that the capacitor 420 charges to $V_{OUT}$. Also, capacitor 415 is connected in parallel to capacitor 410 and charge is transferred from capacitor 415 to capacitor 410. In the second clock phase, switches 475, 480, 485 and 490 are closed Φ' denotes the second clock phase in FIG. 4) and switches 455, 460, 465 and 470 are opened. So, the capacitor 415 is connected to the $V_{OUT}$ such that the capacitor 420 charges to $V_{OUT}$. Also capacitor 420 is connected in parallel to capacitor 410 and charge is transferred from capacitor 420 to capacitor 410.

Figure 1:
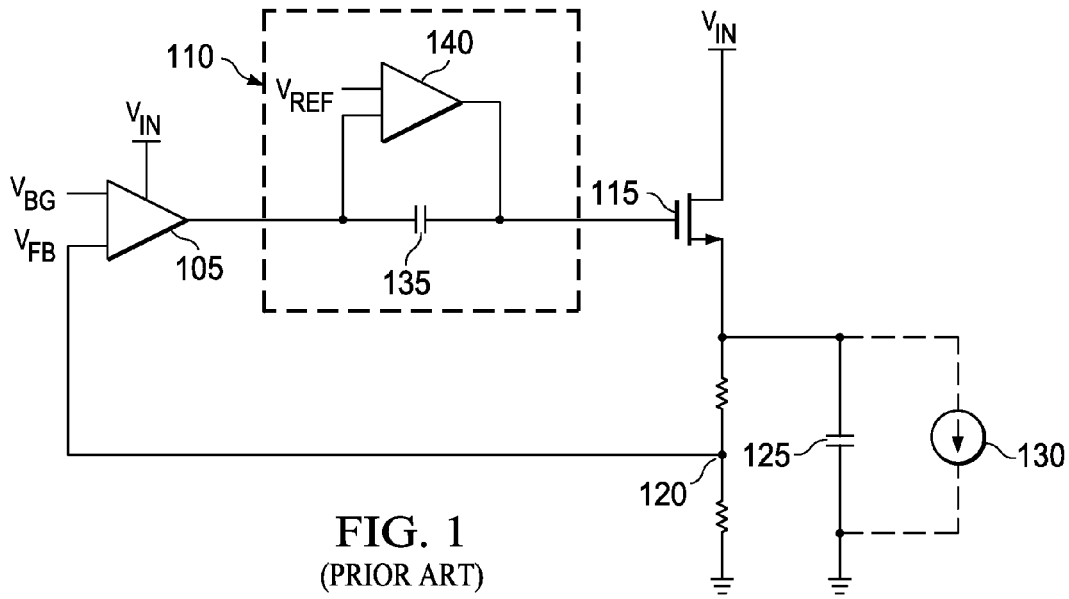
FIG. 1 illustrates an LDO regulator with a charge pump according to prior art.

It is noted that the dual bootstrapped charge pump works during both the clock phases such that peak to peak ripple at the output of the LDO is reduced. The capacitance and switches do not double, however the ripple becomes half of that of the bootstrapped charge pump that is illustrated in FIG. 1. This also helps to sense the output change faster and reduces the startup time and transient glitch. If gate leakage current is "$I_G$", the capacitor network (capacitor 415 and 420) together give the current resulting in a very small ripple at the gate which is equal to $I_G*C/2*f$, where f is the switching frequency and C is the capacitance of the capacitor 410.

Figure 5:
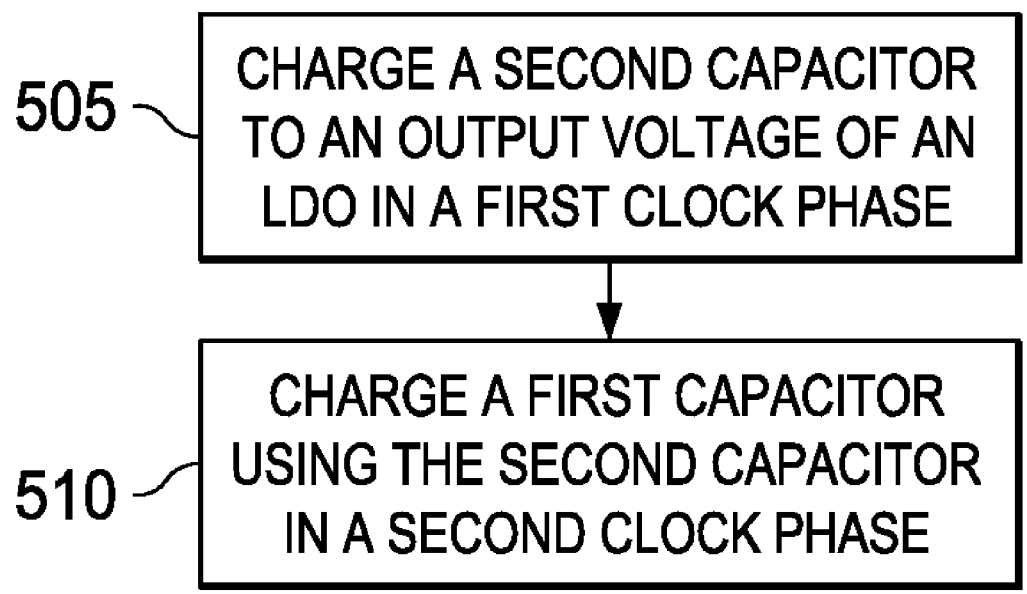
FIG. 5 illustrates a flow diagram according to an embodiment.

FIG. 5 illustrates a flow diagram according to an embodiment. At step 505, a second capacitor (for example capacitor 215) is charged to an output voltage of the LDO in a first clock phase. The second capacitor is connected between an output of the LDO and to a ground. The second capacitor is charged by controlling a first plurality of switches (for example switches 240 and 245) using a plurality of control signals. At step 510, a first capacitor (for example capacitor 210) is charged using the second capacitor in a second clock phase. The first capacitor is connected between an output of an amplifier of the LDO and a gate of a pass transistor. The first capacitor is charged by controlling a second plurality of switches (for example switches 230 and 235) using a plurality of control signals. In this embodiment plurality of control signals are generated using an oscillator (270) and a level shifter (275).

Using various embodiments, the LDO does not require any additional amplifier for servo loop or any additional charge pump capacitor for the amplifier. This saves area and power. Further as noted above, an embodiment reduces the ripple significantly as the dual bootstrapped charge pump uses the output capacitance itself to bootstrap its voltage. The switching scheme of an embodiment can be easily adapted to any voltage and output power device size. Further an embodiment can use arbitrarily low clock frequency to save power as the series capacitance does not discharge unless there is some amount of leakage.

In the foregoing discussion, the term "connected" means at least either a direct electrical connection between the devices connected or an indirect connection through one or more passive or active intermediary devices. The term "circuit" means at least either a single component or a multiplicity of components, either active or passive, that are connected together to provide a desired function. The term "signal" means at least one current, voltage, charge, data, or other signal. It is to be understood that the term transistor can refer to devices including MOSFET, PMOS, and NMOS transistors. Furthermore, the term transistor can refer to any array of transistor devices arranged to act as a single transistor.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A charge pump in a low dropout regulator comprising:
   an amplifier having an output;
   a first capacitor coupled to the output and to a gate of a pass transistor;
   a first plurality of switches operable to couple a second capacitor between an output of the low dropout regulator and to a ground in a first clock phase such that the second capacitor charges to an output voltage; and
   a second plurality of switches operable to couple the second capacitor in parallel to the first capacitor in a second clock phase such that the second capacitor charges the first capacitor.

2. The charge pump of claim 1, wherein the plurality of switches include at least one of a complementary switch, an n-type metal oxide semiconductor field effect transistor switch and a p-type metal oxide semiconductor field effect transistor switch.

3. The charge pump of claim 1, wherein the plurality of switches functions in response to a plurality of control signals.

4. The charge pump of claim 3, wherein an oscillator and a level shifter together generate the plurality of control signals.

5. A charge pump in a low dropout regulator, comprising:
   an amplifier having an output;
   a first capacitor coupled to the output and to a gate of a pass transistor;
   a first plurality of switches that is operable to couple a second capacitor between an output of the low dropout regulator and to a ground in a first clock phase such that the second capacitor charges to an output voltage, and that is operable to couple a third capacitor in parallel to the first capacitor such that the third capacitor charges the first capacitor; and
   a second plurality of switches that is operable to couple the third capacitor between an output of the low dropout regulator and to a ground in a second clock phase such that the second capacitor charges to an output voltage, and that is operable to couple the second capacitor in parallel to the first capacitor such that the second capacitor charges the first capacitor.

6. The charge pump of claim 5, wherein the first plurality of switches and the second plurality of switches function in response to a plurality of control signals.

7. The charge pump of claim 6, wherein an oscillator and a level shifter together generate the plurality of control signals.

8. The charge pump of claim 7, wherein the level shifter translates a clock signal that is generated by the oscillator to appropriate voltage and polarity that controls each switch of the first plurality of switches and the second plurality of switches.

9. The charge pump of claim 5 and further comprising:
   an external capacitor at the output of the low dropout regulator, wherein the external capacitor provides a charge that compensates a parasitic capacitance of the second capacitor and third capacitor during the first clock phase and the second clock phase.

10. The charge pump of claim 5, whereby startup time of the low dropout regulator and transient glitch is reduced.

11. The low dropout regulator of claim 5, whereby ripple at the output of the low dropout regulator is reduced.

12. A method for operating a charge pump in a low dropout regulator, comprising:
    charging a second capacitor to an output voltage of the low dropout regulator in a first clock phase, the second capacitor being coupled between an output of the low dropout regulator and to a ground; and
    charging a first capacitor using the second capacitor in a second clock phase, the first capacitor being coupled between an output of an amplifier of the low dropout regulator and a gate of a pass transistor.

13. The method of claim 12, wherein charging a second capacitor and charging a first capacitor comprising controlling a plurality of switches using a plurality of control signals.

14. The method of claim 13, wherein controlling a plurality of switches generating the plurality of control signals using an oscillator and a level shifter.

* * * * *